United States Patent [19]

Fidler et al.

[11] 4,321,609

[45] Mar. 23, 1982

[54] BI-DIRECTIONAL INK JET PRINTER

[75] Inventors: Thomas D. Fidler, Lake Orion; Anthony P. Sapino, Rochester, both of Mich.

[73] Assignee: Computer Peripherals, Inc., Minneapolis, Minn.

[21] Appl. No.: 209,433

[22] Filed: Nov. 24, 1980

[51] Int. Cl.³ .......... G01D 15/18

[52] U.S. Cl. .......... 346/75

[58] Field of Search .......... 346/75; 400/126

[56] References Cited

U.S. PATENT DOCUMENTS 4,075,636 2/1978 Galetto et al. .......... 346/75

4,138,688 2/1979 Heard et al. .......... 346/75

*Primary Examiner*—Joseph W. Hartary

*Assistant Examiner*—W. J. Brady

*Attorney, Agent, or Firm*—William J. McGinnis, Jr.; Joseph A. Genovese

[57] ABSTRACT

An ink jet printer is provided which will print in both the left to right and right to left directions of ink jet head travel with respect to the print media. Relative horizontal displacement of ink jet droplets caused by horizontal travel of the ink jet head is compensated for by a deflection plate system which is tilted with respect to the direction of travel to provide an electric field which tilts the pattern of ink jet droplets in an equal and opposite amount from that caused by horizontal movement of the ink jet head. In one direction of travel an ascending pattern of ink jet droplets is provided and in the other direction of travel a descending pattern of ink jet droplets is provided for printing so that the tilted deflection plate system compensates appropriately for the particular direction of travel.

2 Claims, 9 Drawing Figures

DROP POSITION
12
18B
GUTTER
30
MEDIA
DESCENDING SCAN
UPPER DEFLECTION PLATE
LOWER DEFLECTION PLATE
24
26
28
9 8 7 6 5 4 3 2 1

ASCENDING SCAN

2ℓ
56

54
H

α
52

ℓ
50

FIG. 4
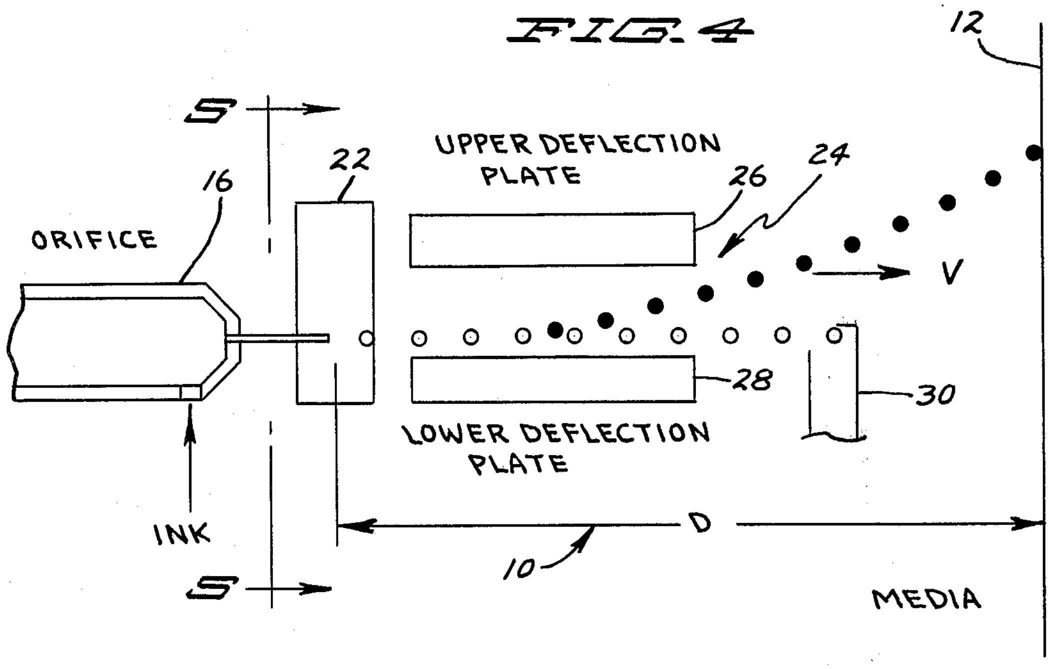
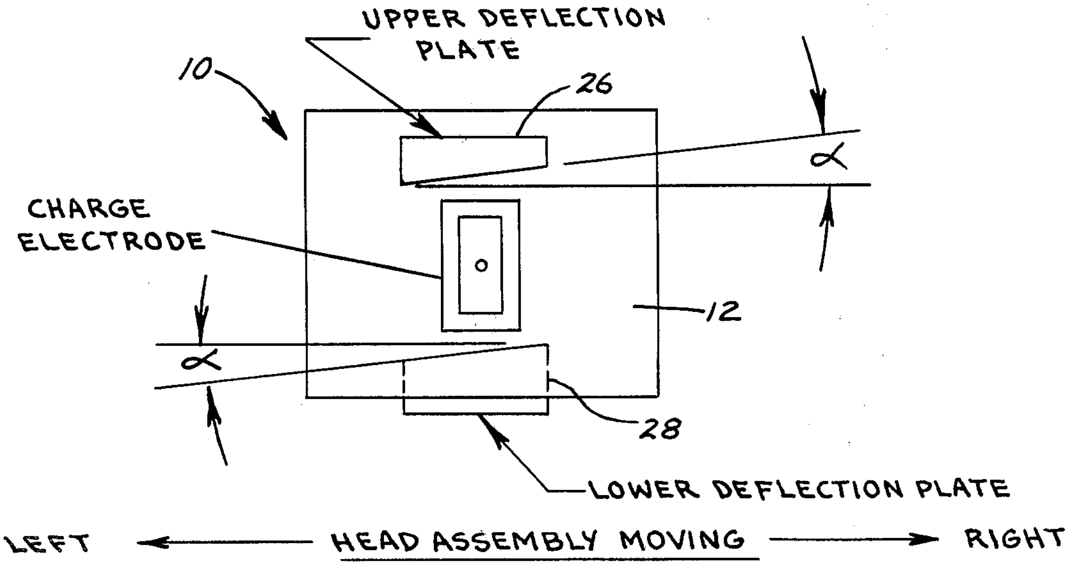
FIG. 5

BI-DIRECTIONAL INK JET PRINTER

BACKGROUND OF THE INVENTION

This invention relates to the ink jet printing art. More particularly, this invention relates to a solution to the problem caused by horizontal movement of the ink jet print head during printing and the skewing of the printing pattern caused by that movement. Further, it is clearly more satisfactory to print in both directions of head travel than in just one direction of travel which requires a non-functioning return. However, printing in both directions of head travel requires a different skewing correction for left to right travel than for right to left travel.

The problem of compensation for the traveling motion of the ink jet head in printing for both directions of travel is discussed in U.S. Pat. No. 4,138,688. That patent shows an electronic system by which the electric field between the deflection plates is altered or distorted in a particular way to cause ink job droplets deposited on the printing media to be vertically aligned and to compensate for horizontal travel. However, the ink jet head and deflection plate system as shown in that patent is comparatively sophisticated and complex. It would be desirable to have a system of deflection plate electronics similar to that for unidirectional printing and yet useable for bi-directional printing.

Accordingly, this invention relates to the provision of a bi-directional ink jet printer in which a particular deflection plate system compensates for skewing in both directions of travel of the ink jet head by reversing the direction of ink jet scanning as head travel direction is reversed.

SUMMARY OF THE INVENTION

This invention shows an ink jet printer for printing in both left to right and right to left directions of ink jet head travel. The deflection plates which drive the ink jet droplets are tilted in the direction of ink jet head travel. Thus, where the ink jet droplets are scanned vertically starting from the bottom (an ascending scan), as the scan reaches its highest vertical deflection, the ink jet droplets are traveling closer to the top deflection plate and also moving backward relative to the direction of travel so that a true vertical line of ink jet droplets is scanned on the printing medium.

It would be mechanically awkward to change the angle of tilt of the deflection plates as the ink jet head reverses direction. Thus, this invention provides for a system in which the ink jet droplets are scanned in, for example, ascending direction for left to right travel and in a descending pattern for right to left travel of the ink jet head. The use of opposite scanning directions for ink jet droplets for opposite directions of travel of the ink jet head allows the deflection plates to be permanently positioned at the appropriate angle with respect to travel of the ink jet head so that vertical patterns of ink jet droplets are scanned. This invention includes control circuitry for the ink jet charge electrodes so that as the direction of head travel is reversed the direction of scanning of ink jet droplets is reversed.

To provide proper separation, spacing, control and overlapping of ink jet droplets, it has been found that not every ink jet droplet in a train of droplets should be charged. Thus, there has developed in the art various guard drop schemes where particular ink jet droplets are charged allowing other uncharged ink jet droplets to be carried to the ink collection gutter and returned to the ink system. The simplest such scheme is an alternate guard drop scheme in which every other ink jet droplet is charged with the others being uncharged. In the present invention, it has been found that the alternate guard drop scheme is appropriate.

IN THE FIGURES

FIG. 1 is a schematic diagram of an ink jet printer according to the present invention.

FIG. 2A diagrammatically shows an ascending scan pattern of ink jet droplets according to the present invention.

FIG. 4 is a detailed side cross-sectional diagrammatic view of the ink jet head and deflection plate system according to the present invention.

FIG. 5 is a cross-sectional view along lines 5—5 of FIG. 4 through the deflection plate and head assembly of an ink jet printer according to the present invention in the same plane as the printing medium would occupy.

DESCRIPTION OF THE PREFERRED EMBODIMENTS

Figure 1:
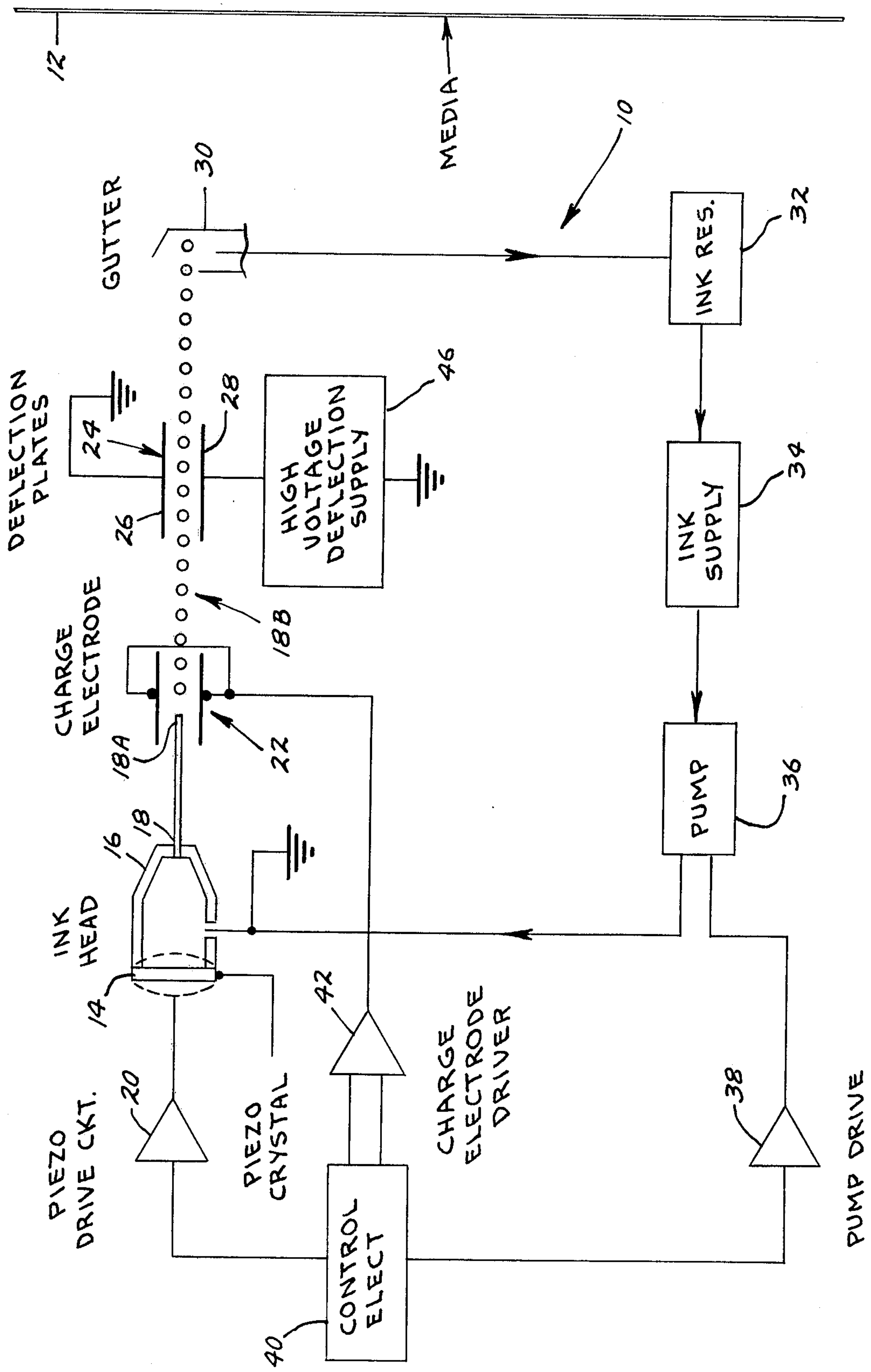

Referring now to FIG. 1, a basic ink jet head and deflection plate system 10 for an ink jet printer according to the present invention is shown for use with respect to a printing medium 12, all of which is shown diagrammatically in this figure. The mechanical relationship of the deflection plates is better shown in FIGS. 4 and 5 and the purpose of FIG. 1 is to show the relationship of the mechanical elements, diagrammatically shown, and the various electrical control systems.

As in continuous ink jet printers, a piezoelectric crystal or some appropriate high frequency drive element 14 is provided in an ink jet head 16 to excite the fluid ink stream or jet discharged from nozzle 18 to produce ink droplets. The drive element 14 is driven by an electronic drive source 20 sufficient to excite the ink stream 18A. Ink jet droplets 18B emanating from the stream 18A pass through a charge electrode assembly 22 and are selectively charged. The ink droplets 18B pass through a deflection plate assembly 24 consisting of an upper deflection plate 26 and a lower deflection plate 28. The path of motion of charged ink droplets 18B will be affected by the activated deflection plate assembly 24. The amount of deflection is proportional to the charge placed on the drops in the charge electrode assembly 22. The amount of charge applied to different droplets is varied to generate ascending and descending scan patterns. Uncharged ink droplets 18B which pass through the deflection plate assembly 24 are not deflected and continue in a straight line into the ink collection assembly 30 commonly known as a gutter.

Ink collected in gutter 30 is drained to an ink reservoir 32 and conducted by appropriate means to a main ink supply 34. An appropriate pump 36 receives ink from the ink supply 34 and supplies ink to the ink head assembly 16. Thus, a complete ink circulating system exists in an ink jet printer and is thoroughly described in numerous prior art patents. The pump 36 is controlled by a pump drive circuit 38. The pump drive circuit as well as the drive element circuit 20 are controlled by a main control electronic circuit 40.

The control circuit 40 controls a charge electrode driver 42 which supplies high voltage to the charge electrode assembly 22 which selectively charges the ink jet droplets. Generally, the operation of a system as shown in FIG. 1 is understood from the prior art. A high voltage deflection plate supply 46 is connected to the deflection plate assembly 24 with one electrical connection to upper deflection plate 26 and one electrical connection to lower deflection plate 28.

Figures 2A, 2B, 3A, 3B, 3C, 3D:
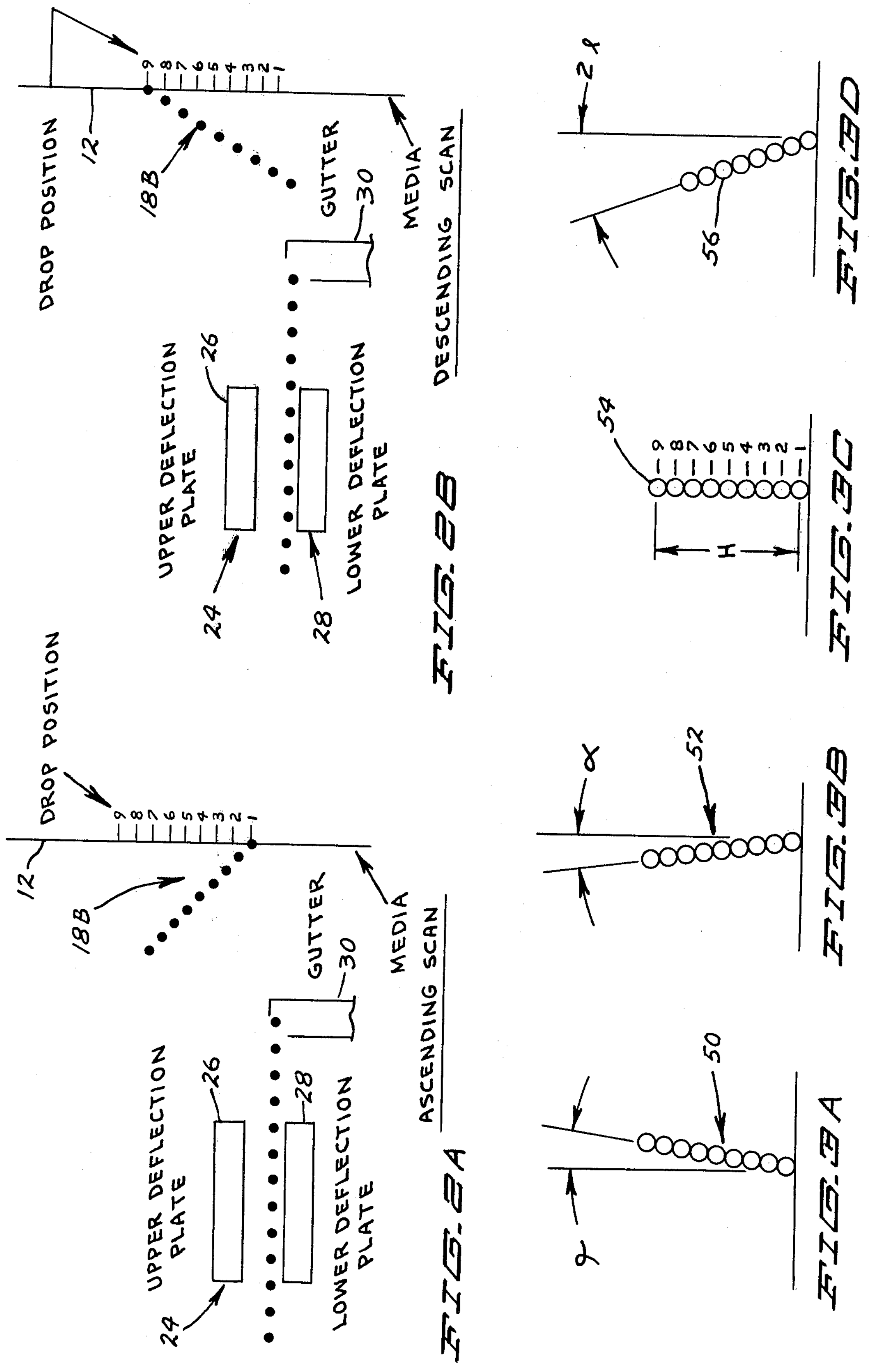
FIG. 2B shows a descending scan pattern according to the present invention.
FIG. 3A shows the relation of the pattern of horizontal displacement of ink jet droplets with the deflection plates parallel to the direction of travel using an ascending scan with ink jet head travel in the left to right direction.
FIG. 3B shows the relation of the pattern of ink jet droplets deposited in right to left travel of the ink jet head with the deflection plates paralled to the direction of travel using an ascending scan.
FIG. 3C shows the relation of the pattern of ink jet droplets with the deflection plates tilted, according to the present invention, using an ascending scan with ink jet head travel in the left to right direction.
FIG. 3D shows the pattern of ink jet droplets deposited with tilted deflection plates as shown in FIG. 5 using right to left travel of the ink jet head with an ascending scan.

Referring now to FIG. 2A an ascending scan pattern of ink jet droplets 18B is deflected toward a print media 12. The control for the charge electrode assembly 22 causes an ascending scan charge relationship to be placed on the ink droplets so that the charged ink jet droplets form a vertical pattern on the media 12 while uncharged particles are collected in gutter 30. FIG. 2B shows a descending scan pattern of ink droplets deflected toward the media 12 where the charge electrode assembly 22 places the descending scan pattern charge relationship on the ink jet droplets. For the ascending pattern, the lowest placed ink jet droplet is charged first while, for a descending pattern, the highest placed droplet is charged first. Thus, ink jet droplets may be scanned vertically either in an ascending fashion as shown in FIG. 2A or a descending pattern as shown in 2B. Prior art systems commonly use one only one of these scan patterns. The present invention requires the use of an ascending scan pattern for one direction of ink jet head travel with respect to the printing medium and a descending scan pattern with respect to the other direction of head travel with respect to the printing medium.

Referring now to FIG. 3A, for deflection plates parallel to the direction of motion if a true vertical scan of ink jet droplets occurs during left to right head movement in an ascending pattern then, a pattern of ink jet droplets 50 is formed in a straight line but skewed at an angle $\alpha$ as shown diagrammatically in the figure because of ink jet head movement. In these illustrations, the example of a nine drop pattern of ink droplets is used and an alternate drop-guard drop scheme is used. Similarly, if printing occurs during both directions of travel of the ink jet head according to the prior art then, for the right to left direction of head travel using an ascending scan pattern, a pattern of ink jet droplets 52 as shown in FIG. 3B is formed at an angle of deflection $\alpha$ but in the opposite direction from that which occurs in left to right travel as shown in FIG. 3A. Using the tilted deflection plate system as shown if FIGS. 4 and 5 according to the present invention and as will be described in more detail later, a true vertical pattern of ink jet droplets 54 may be formed as shown in FIG. 3C in the left to right direction of head travel with an ascending scan pattern. However, as shown in FIG. 4D the tilted deflection plate system, if used for a right to left head travel with an ascending scan, will cause ink jet droplets to be deposited at double the skew angle as compared to the untilted deflection plate system in right to left head travel. This is shown in FIG. 3D by the pattern of ink jet droplets in a straight line deposited at 56 at an angle of $2\alpha$.

Referring now to FIG. 4, the deflection plate system 24 according to the present invention for controlling ink jet droplets is shown in greater detail using the same reference numbers as in FIG. 1. FIG. 5 is a cross-sectional view through FIG. 4 on lines 5—5 of FIG. 4 to show that the deflection plates 26 and 28 are tilted with respect to the direction of ink jet head travel. The surfaces of the deflection plates 26 and 28 are skewed at an angle $\alpha$ which is the skew angle of an ink jet droplet pattern using untilted deflection plates. The tilted deflection plates cause a compensating skewing of ink jet droplets so that when the ink jet head is in motion the droplets are deposited on the printing medium in a true vertical orientation.

In general it can be shown that the angle $\alpha$ described in FIG. 5 can be computed from the following equation if an alternate guard drop scheme is used.

$$\alpha = \tan^{-1} 2 (N-1) \frac{(V)}{(f)} \quad \frac{(1)}{(N-1) R}$$

where $\alpha$ is in degrees,

N is the number of drops associated with the maximum vertical segment in the character set, f is the piezoelectric drive frequency (HZ), R is the vertical spacing between drops on the paper (inches), and V is the volocity of the carrier (ips).

A more general form of the equation is shown below which accounts for different guard drop schemes.

$$\alpha = \tan^{-1} (N - 1 + G) \frac{(V)}{(f)} \quad \frac{(1)}{(N-1) R}$$

where G is the number of guard drops inserted in the segment

Referring again to FIG. 1, deflection plates 26 and 28, when arranged as shown in FIG. 5, cause a true vertical orientation of ink jet droplets on the print medium 12 when an ascending scan pattern is used in left to right direction of ink jet head travel. The skewing caused by head motion depends on the volocity of head motion during travel. Preferably head motion will be at a constant and repeatable volocity at any time printing is occurring. While an ascending scan pattern of ink jet droplets occurs during left to right motion of head travel, the control circuits 40 and 42 cause a descending pattern of ink jet droplets to occur during right to left motion. True vertical orientation of ink jet droplets, therefore, occurs during both directions of travel because the control system 40 causes reversal of the scanning pattern at the same time head travel is reversed.

Obviously, the deflection plates may be tilted in the opposite direction from that shown in FIG. 5 and a descending pattern of ink jet droplets scanned in left to right head travel and an ascending pattern of ink jet droplets scanned in right to left head travel. If, for example, it were desired to print characters at an angle in a pseudo italic fashion on the ink jet printer, the scanning pattern could be fixed to be the reverse of what was necessary to cause true vertical scanning so that scanning would actually occur at an angle which was twice the normal skew angle. Obviously, it may never be desirable to employ this feature with respect to this invention, but it is certainly possible to implement it within the scope of the invention.

What is claimed is:

1. An ink jet printer in which printing can occur in both directions of ink jet head travel comprising:

means for providing excited ink droplets, said means adapted to travel with respect to the printing medium, means for charging the ink droplets with an electric charge, means for controlling said means for charging ink droplets to determine an ascending or descending scan pattern, deflection plate means having at least a first deflection plate and a second deflection plate disposed at an angle with respect to the direction of travel of said means for providing the excited ink particles, where the angle of tilt of the deflection plates from the horizontal is $\alpha$ and is determined by the formula:

$$\alpha = \tan^{-1} 2 (N - 1 + G) \frac{(V)}{(f)} \quad \frac{(1)}{(N-1) R}$$

where $\alpha$ is in degrees,

N is the number of drops associated with the maximum vertical segment in the character set, f is the piezoelectric drive frequency (HZ), R is the vertical spacing between drops on the paper (inches), V is the velocity of the carrier (ips), and where G is the number of guard drops inserted in the segment, means for providing a deflection voltage to said first and second deflection plates, control means responsive to the relative direction of travel of the printing medium with repect to the source of ink jet droplets, wherein said control means causes said means for controlling said means for charging ink droplets to deposit ink droplets in a first scan pattern with respect to the first direction of travel and in a second scan pattern with respect to the other direction of travel of the source of ink jet droplets with respect to the medium on which ink jet particles are to be deposited so that the relative motion of the source and the medium is compensated for by the tilted deflection plates so that the ink jet droplets are deposited in a fashion corresponding to that if the source and medium were stationary with respect to each other and in which both relative directions of motion may be utilized for depositing ink jet dropletes as a result of the use of the two scan patterns of ink jet droplets.

2. The printer of claim 1 in which an alternate guard drop scheme is used and the formula becomes:

$$\alpha = \tan^{-1} 2 (N - 1) \frac{(V)}{(f)} \quad \frac{(1)}{(N-1) R}$$

where $\alpha$ is in degrees,

N is the number of drops associated with the maximum vertical segment in the character set, f is the piezoelectric drive frequency (HZ), R is the vertical spacing between drops on the paper (inches), and V is the volocity of the carrier (ips).

* * * * *